United States Patent [19]
Glasscock et al.

[11] 3,878,196
[45] Apr. 15, 1975

[54] PROCESS FOR MODIFYING STARCH TO OBTAIN A THIXOTROPIC STARCH

[75] Inventors: Glen C. Glasscock, Warsaw, Ill.; Joseph E. Boyle, Keokuk, Iowa

[73] Assignee: The Hubinger Company, Keokuk, Iowa

[22] Filed: Nov. 21, 1973

[21] Appl. No.: 417,957

[52] U.S. Cl. ................... 260/233.3 A; 260/233.3 R; 260/233.5; 426/167
[51] Int. Cl. ............................................ C08b 19/06
[58] Field of Search.... 260/233.3 A, 233.3 R, 233.5

[56] References Cited
UNITED STATES PATENTS
3,549,618   12/1970   Speakman.................... 260/233.3 A
3,716,527   2/1973    Speakman.................... 260/233.3 R Primary Examiner—Melvyn I. Marquis
Attorney, Agent, or Firm—Johnston, Keil, Thompson & Shurtleff

[57] ABSTRACT

Thixotropic starch is produced by reacting a starch in the form of solid particles with a small amount of an aldehyde and carrying out the reaction at a predetermined pH under temperature conditions and for a period of time such that a thioxtropic starch is formed without reacting all of the aldehyde with the starch. The resultant product is then washed with water sufficiently to remove the unreacted aldehyde and recovered in any suitable manner, for example, by filtering and drying. By using an aldehyde such as acrolein products are obtained which are especially useful in making pies and other food products.

9 Claims, No Drawings

PROCESS FOR MODIFYING STARCH TO OBTAIN A THIXOTROPIC STARCH

BACKGROUND

Thixotropy is the property of certain gels of becoming fluid on shaking and forming a gel again when left at rest. A thixotropic gel is a gel having this property. For the purpose of this disclosure a thixotropic starch is a starch which when dispersed in an aqueous liquid will form a liquid dispersion that sets to a gel when left at rest and becomes fluid again when shaken, stirred, mixed, blended or otherwise disturbed. When allowed to rest after being disturbed a gel will again form. This change in physical state can take place repeatedly.

The term "starch" as used herein refers to the following types of material: waxy, non-waxy, amylose, amylopectin, native starches, high amylose (up to and including 100% amylose), sago, milo and any other starch or starchy materials regardless of their origin; potato, tapioca, wheat, modified starches, inhibited or cross linked or cross bonded starches (usually identifiable by their GSP or Granular Swelling Power); acid modified thin boiling starches, oxidized starches, mechanically modified starches, ball-milled starches, rolled starches, dextrins (all types), all chemically and physically modified starches for whatever purpose, esters and ethers, cynoethylated, hydroxyethyl, hydroxymethyl, and hydroxypropyl starches.

It is known in the art to use aldehydes in changing the pasting characteristics of various types of starches to give a shortness to the pastes by so-called inhibition, e.g., U.S. Pat. No. 2,500,900; also patents which describe the use of aldehydes for producing an antiseptic type of starch products, e.g., German Pat. Nos. 129,884, 131,399, 92,249 and 109,053; also patents which do not appear to give or involve an actual chemical cross linking, e.g., U.S. Pat. Nos. 2,121,502; 2,124,372 and 2,317,752.

Various processes are known as shown in U.S. Pat. Nos. 2,461,129; 2,510,748; 2,657,192; 2,698,936; 2,867,615 and 2,968,581 which do not describe or show a thixotropic gel as disclosed herein; also in U.S. Pat. No. 3,069,410 which clearly shows and demonstrates that unless the aldehyde group reacts with the starch until the reaction product is substantially free of the aldehyde groups the pasting properties of the starch are virtually unchanged.

Another process is disclosed in U.S. Pat. No. 3,321,422 which pertains to a reaction of an aldehyde to give a water soluble starch material by reaction of water soluble starch materials with a water soluble addition polymer of sodium bisulfite and acrolein which has no relation to this invention.

To summarize, it has been shown by prior art that inhibited or chemically cross linked and non-cross linked starches have been made using various aldehydes. It is apparent from various patents in the past that the aldehydes may or may not react with the starch.

OBJECTS

One of the objects of this invention is to produce a new and improved thixotropic starch.

Another object is to provide a new method for imparting a thixotropic property to various types of starch or starch materials in granular ungelatinized starch form which have not been cooked, swelled, gelatinized or altered and have the appearance of their original chemical or physical form.

A further object is to provide a granular, ungelatinized starch which when dispersed in water and cooked produces a cooked starch material having an improved thixotropic property.

An additional object is to provide a new method of improving rapidity of congealing of a hot cooked starch when cooled and aged.

Still another object is to impart a thixotropic gel property to starch cooks which would normally be fluid when cooled and aged.

Another object is to produce a thixotropic gel in starch cooks so as to control the flow properties in the final end use.

Still another object is to produce a thixotropic gel in conventional starches so that usage levels may be reduced due to the thixotropic gel properties.

A principal object of the invention is to provide a useful thixotropic gel property in all types of starches which would benefit from such. Other objects will appear hereinafter.

BRIEF SUMMARY OF THE INVENTION

In accordance with the invention a thixotropic starch is produced by reacting a starch, in the form of solid particles, with a small amount, preferably 0.01 to 10.0% by weight of an aldehyde, preferably an unsaturated aliphatic normally liquid aldehyde, carrying out the reaction at a predetermined pH within the range of 0.1 to 9.9 under temperature conditions and for a time such that a thixotropic starch is formed without reacting all of said aldehyde with the starch, washing the resultant product with water sufficiently to remove the unreacted aldehyde, and recovering the solid product in any suitable manner, for example, by filtering and drying.

By carrying out the foregoing process with an aldehyde such as acrolein, the use of which has been cleared for food uses, the resultant thixotropic starches produce excellent thixotropic gels in standard acid pies. These products can also be prepared with thixotropic properties which make them useful in salad dressings, and other food products.

DETAILED DESCRIPTION OF THE INVENTION

The invention is applicable to the treatment of any type of starch as previously defined. It is especially useful on starches which give a fluid gel when cooked in water, that is to say, a gel which does not retrograde but remains fluid when cooled to 25°C. after the starch has been cooked in water. Specific examples are given hereinafter which illustrate the application of the invention to preferred types of starches.

In carrying out the invention various types of aldehydes can be employed such as formaldehyde which is used as a 37% by weight solution in water, paraformaldehyde which is a solid polymer of formaldeyde, acrolein and crotonaldehyde which are normally liquid unsaturated aliphatic aldehydes and benzaldehydes which is an aromatic aldehyde. Where the final product is intended to be employed for food purposes, it is desirable to employ acrolein as the aldehyde because it can be used in amounts (0.6% or less) which are considered to be safe for the manufacture of food products.

The reaction can be carried out on the alkaline side, for example, at a pH within the range of 7.0 to 9.9, or it can be carried out on the acid side at a pH of at least 0.1 but below pH 7, preferably at a pH of at least 1.8 and not higher than 3.5. If the reaction is carried out on the acid side it is usually preferable to have a pH of at least 1.8 because even though lower pH's can be used down to 0.1, such lower pH's also degrade the starch and, for example, might change an ordinary starch to a thin boiling starch.

A pH of 10 is unsatisfactory because all of the aldehyde reacts and it seems essential for the purpose of the invention to have some unreacted aldehyde in the product prior to the final recovery of the product.

The mechanism of the reaction of this invention is not fully understood as to whether it is a physical bond or a chemical bond or combination of both or neither. However, the reaction as illustrated hereinafter in various examples does not necessarily have to change the pasting properties. It can or cannot be made to do so depending upon the desired characteristics of the final product so as to give a thixotropic gel which returns after being shaken, stirred, mixed, blended or otherwise disturbed to the original thixotropic gel. This phenomenon can be repeated time and time again with the thixotropic gel being returned in each case in a short length of time after it has been disturbed by some of the methods listed.

If the aldehyde group and the double bond have fully reacted with the starch (either by too high a pH, say 10 or above or until the reaction product is left so long that it is substantially free of the aldehyde group) there will be no thixotropic gel obtained but rather a starch which when cooked appears to be inhibited or cross bonded when the Granular Swelling Power (GSP) is checked.

Since in most cases the reactions are carried out for short periods of time and at pH's which aldehydes react more slowly, the aldehyde groups are never fully reacted. Never being fully reacted out and not being free of aldehyde, it is necessary in most cases and (due to the nature of most aldehydes because of odor, irritation, etc.) it is desirable and suggested that a closed system of some type be used up to the point where the excess aldehydes have been thoroughly washed or removed by other means from the reaction product.

The starch which is reacted with the aldehyde can be used in various forms, for example, cooked suspensions, slurries of ungelatinized starch granules in water and dry starch granules in powder form containing enough moisture to make them free-flowing.

The time and temperature conditions employed in carrying out the reaction are subject to variation depending upon the type of aldehyde, the type of starch, the form in which the starch is used, and the pH. For example, when using a slurry of unmodified starch containing 42 to 46% solids with acrolein as the aldehyde at a pH of around 8.3, a temperature within the range of 90°F. to 120°F. for ten minutes will produce a thixotropic starch having the properties desired for the purpose of the invention. If a modified starch were employed the solids content of the slurry should preferably be somewhat lower, say around 40%. In either case the quantity of acrolein is preferably around 0.4% based on the weight of the starch. Larger amounts up to 10% could be used but would be unnecessary in most cases. If the same process were carried out on the acid side at a pH of around 3.2, for example, a reaction period of 4 to 5 hours might be required in order to obtain the desired thixotropic property. Generally speaking, the aldehyde reaction on the acid side is increased as the acidity is lowered and the temperature is increased. Likewise, the aldehyde reaction increases on the alkaline side as the pH and temperature are increased.

In certain products produced in accordance with the invention it is desirable to produce in situ not only the thixotropic property but other desirable properties obtained by hydrolysis, chlorination, oxidation, methylation, acetylation, or other acylation, carbon and nitrogen substitution, sulfonation and cyanoethylation, some of which will be illustrated in the examples hereinafter given.

From the nature of the reaction it appears that the aldehyde is reacted on the starch as a physical bond as well as with the starch as a chemical bond or as partially saturating the starch. Regardless of how the reaction occurs a starch is produced which when cooked and thereafter cooled produces a thixotropic gel. The proportions of thixotropic starch used to form a thixotropic gel will vary depending upon the medium in which the starch is cooked as well as upon the extent to which the starch is modified or degraded. Thus, with an unhydrolyzed thixotropic starch the quantity employed might be 5.5% by weight of an aqueous solution containing sugar and fruit juices without the fruit or 2.5% by weight based upon a similar medium containing fruit. Where a 5% by weight quantity of starch might be employed if the starch were unhydrolyzed a 25% by weight quantity might be used if the starch were hydrolyzed.

If the reaction between the aldehyde and the starch is carried out with the solid starch particles in an aqueous slurry, temperatures within the range of 90°F to 120°F. are preferred, and temperatures above the boiling point of water would be undesirable. On the other hand, if the reaction between the aldehyde and the starch is carried out with the starch in dry solid form, temperatures as high as 350°F. can be used, for example, a temperature of 320°F. for eight hours. In general, the temperature can be within the range of 30°F. to 350°F. and the time of reaction can be within the range of one minute to forty hours, depending upon the type of product desired.

As previously indicated, the washing of the thixotropic starch to remove unreacted aldehyde is preferably carried out in a closed system so that aldehyde vapors cannot enter the atmosphere. In such a system using, for example, 110 gallons of water and 100 pounds of starch, the wash water can be stripped of aldehyde and recycled again. The final product is preferably recovered by filtering it. Prior to or during the washing step the pH of the product is adjusted to within the range of 5 to 7, preferably to a pH of about 6. This is accomplished by adding sodium hydroxide or other suitable alkali if the reaction has been carried out on the acid side or by adding hydrochloric acid, sulfuric acid or citric acid or other suitable acid if the reaciton had been carried out on the alkaline side.

Certain instruments have been used to evaluate the products and show that a thixotropic gel does exist, two of the more common ones being the Brookfield Heliopath Viscometer which is used to record and show viscosity in centipoises (cps) in gelled materials, and the other being the Bostwick Flow Viscometer which records the amount of flow a product has in a given amount of time and is read in centimeters (cm) of flow (the higher the cm the more flow and vice versa) in intervals of 15 seconds, 30 seconds, 45 seconds and 60 seconds.

To demonstrate the thixotropic gel a starch exhibits, a standard acid pie cook (less fruit) was used and cooked in the Bradender Amylo-graph using the following:

| | | |
|---|---|---|
| 22.5 | grams dry basis starch (10.0% moisture) | 25 grams |
| 100.0 | grams sucrose | 100 grams |
| 60.0 | grams Hi Sweet 71 (71 DE 43 Be.° corn syrup) | 60 grams |
| 120.0 | grams Cranberry juice (Ocean Spray) | 120 grams |
| 240.0 | grams distilled water | 240 grams |
| Total 545 grams | | |

Samples were cooked at 95°C. and held for 20 minutes in the Brabender Amylo-graph, removed and force cooled to 80°F. at which time the thixotropic gel characteristics were checked by the Brookfield Viscometer using the Brookfield Heliopath Standard Model C spindle T-B at 4 rpm. Note: This cuts a new path with each revolution which is necessary in checking the thixotropic gel properties of the starch illustrated in the following examples. The thixotropic gel properties of the cooks were also checked on the Bostwick Flow Viscometer.

The products produced in accordance with the invention can have various properties depending upon the desired end use. Thus, for standard acid pie cooks without the fruit, the product might have a granular swelling power (GSP) of about 16 and after cooking, cooling and allowed to remain at rest for 5 minutes, the Brookfield viscosity at 80°F. might be around 18,000 cps. Upon stirring, the Brookfield viscosity might drop to 14,000 cps due to the thixotropic property and thereafter when allowed to rest for 5 minutes gel formation would again occur and the Brookfield viscosity at 80°F. would go up to 18,000 cps. A control without the thixotropic property would now show the fairly large increase in viscosity after stirring and then being allowed to rest. The Bostwick Flow in the control and the product of the present invention would not be greatly different from one another after stirring but after being allowed to set or rest for 5 minutes the Bostwick Flow of the product of the invention would be less as compared with the Bostwick Flow of the control. These factors are considered to be important in the food industry for making various types of products. Depending upon the use to which the product is used the GSP can vary widely. Thus the GSP might be 7 for a product to be used in a batter mix and 23 for a product to be used in a pudding. Similarly the Brookfield viscosity which might be within the range of 14,000 centipoises to 35,000 centipoises for pie fillings could be within the range of 50,000 cps to 100,000 cps for salad dressings.

The invention will be further illustrated but is not limited by the following examples in which the quantities are stated in parts by weight unless otherwise indicated.

EXAMPLE I 6,000 grams dry substance slurry of waxy merco starch at 21.5 Be°. at 120°–125°F. was adjusted to 11.1 pH with 1:15 ratio of sodium hydroxide and water solution while maintaining the temperature between 120°–125°F. at all times. A cross linking agent was used (phosphorus oxychloride) in the range of 0.02–0.04% until the desired GSP (Granular Swelling Power) was reached (16 GSP). The slurry was adjusted to 5.0 pH with muriatic acid. At this point the batch was split into 2 equal portions of 3,000 grams dry substance each. Half, was filtered and washed twice and dried to 10% moisture by conventional drier and labeled Control I. To the other half or 3,000 grams dry substance was added an aldehyde, in this example acrolein at 0.2% based on dry substance starch (6 grams), and the pH was adjusted to 8.4 with a dilute sodium hydroxide solution and maintained for 20 minutes at 80°F., after which time the pH was again adjusted to 5.0 with hydrochloric acid before the reaction product was free of the aldehyde group. Because of odors it is necessary to carry out the reaction in a closed system. This portion was washed through a washing centrifuge twice to remove unreacted acrolein, filtered and dried to 10% moisture and labeled Example I. Results on Control I and Example I were as follows:

| | Control I | Example I |
|---|---|---|
| Brookfield 80°F. as made, stirred | 14,000 cps | 14,200 cps |
| After 5 minute rest | 14,000 cps | 18,200 cps |
| After 16 hours | 15,000 cps | 18,200 cps |
| After 16 hours stirred, rest 5 minutes | 14,000 cps | 18,200 cps |
| GSP | 16.0 | 16.0 |
| pH | 3.2 | 3.2 |
| Bostwick Flow in cm's stirred | 15 sec. 6.4 cm | 15 sec. 6.5 cm |
| | 30 sec. 7.2 cm | 30 sec. 7.0 cm |
| | 45 sec. 7.6 cm | 45 sec. 7.4 cm |
| | 60 sec. 8.0 cm | 60 sec. 7.8 cm |
| Bostwick Flow in cm's set | 15 sec. 6.4 cm | 15 sec. 4.1 cm |
| 5 minutes in machine | 30 sec. 7.3 cm | 30 sec. 4.6 cm |
| | 45 sec. 7.7 cm | 45 sec. 5.4 cm |
| | 60 sec. 8.0 cm | 60 sec. 5.7 cm |

When samples Control I and Example I were cooked in standard cherry pies, Example I had no pan flow, nice gel and was clearer and much more desirable and acceptable than Control I.

EXAMPLE II

Example I was repeated using 0.6% (18 grams) of aldehyde (acrolein) instead of 0.2% (6 grams) and the results on the acid pie cook were as follows:

|  | Control II | Example II |
|---|---|---|
| Brookfield 80°F. as made, stirred | 14,000 cps | 15,200 cps |
| After 5 minute rest | 14,000 cps | 21,000 cps |
| After 16 hours | 15,000 cps | 21,200 cps |
| After 16 hours stirred | 14,000 cps | 15,300 cps |
| After 16 hours stirred, rest 5 minutes | 14,000 cps | 21,200 cps |
| GSP | 16.0 | 16.0 |
| pH | 3.2 | 3.2 |
| Bostwick Flow in cm's stirred | 15 sec. 6.2 cm | 15 sec. 6.3 cm |
|  | 30 sec. 7.2 cm | 30 sec. 6.9 cm |
|  | 45 sec. 7.6 cm | 45 sec. 7.2 cm |
|  | 60 sec. 8.0 cm | 60 sec. 7.4 cm |
| Bostwick Flow in cm's set | 15 sec. 6.2 cm | 15 sec. 3.1 cm |
|  | 30 sec. 7.2 cm | 30 sec. 3.2 cm |
| 5 minutes in machine | 45 sec. 7.6 cm | 45 sec. 3.5 cm |
|  | 60 sec. 8.0 cm | 60 sec. 3.5 cm |

The product of Example II when cooked and baked in standard cherry pie fillings was too thick. The starch usage level was reduced by 20% and gave a filling still more desirable and acceptable than the Control I and II. The thixotropic gel was clearly visible when the pan flow was observed in both pies.

EXAMPLE III

This example demonstrates the use of aldehydes (acrolein) in preparing a freeze-thaw stable starch for food use which has the thixotropic gel properties. The thixotropic gel is attached to previously treated hydroxypropylated starch.

6,000 grams dry substance hydroxypropylated waxy maize starch with a 5.4% substitution and a GSP of 15 (made by cross linking with epichlorohydrin) slurried in water to give a 21.5 Be°. gravity at 120°F. was used in this example.

Half of the batch was adjusted to pH 5 with dilute hydrochloric acid, washed and dried to 10.0% moisture and labeled Control III. The other half or 3,000 grams dry substance was treated as follows. The pH was adjusted to 9.1 with magnesium hydroxide and to this portion was added 0.1% of aldehyde (acrolein) and the reaction carried out in a closed system for 10 minutes after which time the product was neutralized to 5.0 pH with hydrochloric acid and washed twice through a washing centrifuge to remove excess acrolein, filtered and dried to 10% moisture. The starch was powdered and retained the same physical properties as the control and labeled Example III.

To demonstrate the thixotropic gel of Example III the starch was cooked using the standard acid pie cook along with Control III.

The results were as follows:

|  | Control III | Example III |
|---|---|---|
| Brookfield 80°F. as made, stirred | 13,500 cps | 13,600 cps |
| After 5 minute rest | 13,500 cps | 22,300 cps |
| After 16 hours | 14,000 cps | 23,100 cps |
| After 16 hours, stirred | 13,500 cps | 14,000 cps |
| After 16 hours, stirred, rest 5 minutes | 13,500 cps | 23,000 cps |
| GSP | 15.0 | 15.0 |
| pH | 3.2 | 3.2 |
| Bostwick Flow in cm's stirred | 15 sec. 6.5 cm | 15 sec. 4.1 cm |
|  | 30 sec. 7.3 cm | 30 sec. 4.6 cm |
|  | 45 sec. 7.7 cm | 45 sec. 5.5 cm |
|  | 60 sec. 8.1 cm | 60 sec. 5.7 cm |
| Bostwick Flow in cm's set | 15 sec. 6.5 cm | 15 sec. 1.5 cm |
|  | 30 sec. 7.3 cm | 30 sec. 2.0 cm |
| 5 minutes in machine | 45 sec. 7.7 cm | 45 sec. 2.5 cm |
|  | 60 sec. 8.1 cm | 60 sec. 2.5 cm |

Cherry pie filling was made with this starch and placed in unbaked shells and frozen and thawed several times. The pies were then baked at 375°F. for 35 minutes. The thixotropic gel was not destroyed by repeated freezing and thawing or upon heating.

EXAMPLE IV

This example demonstrates the usefulness of aldehydes to control the amount of thixotropic gel produced in starch products. Many applications require an improved product with certain characteristics without changing the user's present formula or usage level.

Example III was repeated at a lower level of aldehyde (acrolein) 0.05% and the results on an acid pie cook were as follows:

|  | Control IV | Example IV |
|---|---|---|
| Brookfield 80°F as made, stirred | 14,000 cps | 14,000 cps |
| After 5 minute rest | 14,000 cps | 14,400 cps |
| After 16 hours | 15,000 cps | 15,000 cps |
| After 16 hours stirred | 14,000 cps | 14,000 cps |
| After 16 hours stirred, rest 5 minutes | 14,000 cps | 15,000 cps |
| GSP | 16.0 | 16.0 |
| pH | 3.2 | 3.2 |
| Bostwick Flow in cm's stirred | 15 sec. 6.3 cm | 15 sec. 6.3 cm |
|  | 30 sec. 7.2 cm | 30 sec. 7.1 cm |
|  | 45 sec. 7.6 cm | 45 sec. 7.5 cm |
|  | 60 sec. 7.9 cm | 60 sec. 7.8 cm |
| Bostwick Flow in cm's set | 15 sec. 6.3 cm | 15 sec. 6.1 cm |
|  | 30 sec. 7.2 cm | 30 sec. 6.3 cm |
| 5 minutes in machine | 45 sec. 7.6 cm | 45 sec. 6.7 cm |
|  | 60 sec. 7.9 cm | 60 sec. 6.8 cm |

EXAMPLE V

Using methods previously described a waxy maize starch slurry at 22.5 Be°. and 80°–90°F. (6,000 grams dry substance) was adjusted to an 11.1 pH with magnesium hydroxide solution which had been made up to a 1:10 ratio of magnesium hydroxide and water. Increments of 0.02% acrolein were added until approximately 0.06% acrolein had been added and the desired Granular Swelling Power of 14–16 (a useful GSP range for making acid type pie fillings) had been obtained, at which time the reaction product was substantially free of the aldehyde group, (no free acrolein as such was left). Up to this point the process was similar to that in U.S. Pat. No. 3,069,410. The batch at this point was divided into two equal portions of 3,000 grams dry substance each. Half of the batch was reduced to 6.5 pH with hydrochloric acid and washed twice through a washing centrifuge and labeled Control V after being dried to 10.0% moisture.

The other half of the batch (3,000 grams dry substance) was reduced from pH 11.1 to pH 8.5 with dilute hydrochloric acid at which time a thixotropic gel was imparted to the starch using the same aldehyde (acrolein) at a 0.6% level, reaction being carried out for 20 minutes after which time the pH was further reduced to 6.5 with dilute muriatic acid and the product was washed twice through a washing centrifuge, dried to 10.0% moisture and labeled Example V.

Evaluation of Control V and Example V on a standard acid pie cook demonstrated that one modification with acrolein (Control V) produced an apparent cross linked or inhibited starch while the other modification with acrolein (Example V) imparted a thixotropic gel forming property without changing the GSP as shown in the following test results:

|  | Control V | Example V |
|---|---|---|
| Brookfield 80°F. as made, stirred | 15,500 cps | 15,500 cps |
| After 5 minute rest | 16,500 cps | 20,500 cps |
| After 16 hours | 19,500 cps | 23,500 cps |
| After 16 hours stirred | 15,500 cps | 16,000 cps |
| After 16 hours stirred, rest 5 minutes | 17,000 cps | 20,500 cps |
| GSP | 16.0 | 16.0 |
| pH | 3.2 | 3.2 |
| Bostwick Flow in cm's stirred | 15 sec. 7.7 cm | 15 sec. 5.4 cm |
|  | 30 sec. 8.4 cm | 30 sec. 5.9 cm |
|  | 45 sec. 8.6 cm | 45 sec. 6.1 cm |
|  | 60 sec. 8.7 cm | 60 sec. 6.2 cm |
| Bostwick Flow in cm's set | 15 sec. 7.4 cm | 15 sec. 3.8 cm |
|  | 30 sec. 7.9 cm | 30 sec. 4.4 cm |
| 5 minutes in machine | 45 sec. 8.2 cm | 45 sec. 4.7 cm |
|  | 60 sec. 8.4 cm | 60 sec. 5.0 cm |

EXAMPLE VI

This example demonstrates the use of an aldehyde (acrolein in this example) with an acid catalyst to obtain a thixotropic gel and a desired lowering of the Granular Swelling Power at the same time.

To 2,000 grams of waxy maize starch slurry in water at a 21.5Be°. and a temperature of 120°–125°F. was added sufficient acid catalyst hydrochloric to a pH of 1.8 and 0.6% aldehyde (acrolein in this case) was added. Desired Granular Swelling Power of the product was 21-22. During a reaction period of 5 hours GSP was determined at intervals as follows:

| 1½ | hours | GSP of 44 |
| 3 | hours | GSP of 31 |
| 4½ | hours | GSP of 24 |
| 5 | hours | GSP of 22 |

After 5 hours the pH was adjusted to 5.0 with soda ash, washed twice through a washing centrifuge, filtered and dried to 10.0% moisture. The product labeled Example VI was checked for viscosity and thixotropic gel properties, using a neutral 6% cook, with results as follows:

|  |  | Example VI |
|---|---|---|
| Brookfield 80°F. as made, stirred |  | 18,000 cps |
| After 5 minute rest |  | 26,500 cps |
| After 1 hour |  | 30,000 cps |
| Restirred |  | 18,000 cps |
| After 5 minute rest |  | 26,500 cps |
| Bostwick Flow in cm's stirred |  | 15 sec. 3.1 cm |
|  |  | 30 sec. 3.2 cm |
|  |  | 45 sec. 3.3 cm |
|  |  | 60 sec. 3.3 cm |
| Bostwick Flow in cm's set |  | 15 sec. 16.cm |
|  |  | 30 sec. 2.2 cm |
|  | 5 minutes in machine | 45 sec. 2.2 cm |
|  |  | 60 sec. 2.2 cm |
| GSP |  | 21.3 |
| pH |  | 6.0 |

The product of Example VI when evaluated in cream pie fillings and puddings gave many improved properties over conventional products, e.g., less pan flow, improved mouth feel, better texture and a thixotropic gel which was desirable. The Example VI product could also be used at a much lower quantity level than most conventional starches produced for the same purpose.

EXAMPLE VII

Example VI was repeated at a 0.2 pH to demonstrate the catalytic affect of acid on the thixotropic gel. The desired GSP in this case was 14–16 and was checked as follows:

| ½ | hour | GSP of 21 |
| 1½ | hours | GSP of 18 |
| 2 | hours | GSP of 16 |

The reaction product was neutralized to 5.0 pH with soda ash after 2 hours, washed twice through a washing centrifuge, filtered and dried to 10.0% moisture and labeled Example VII. The thixotropic gel properties were checked using the previously described acid pie cook and were as follows:

|  | Example VII |
|---|---|
| Brookfield 80°F. as made, stirred | 21,500 cps |
| After 5 minutes rest | 30,500 cps |
| Stirred after 1 hour | 21,500 cps |
| After 5 minute rest | 30,500 cps |
| GSP | 25.0 |
| pH | 3.2 |
| Bostwick Flow in cm's stirred | 15 sec. 4.7 cm |
|  | 30 sec. 5.5 cm |
|  | 45 sec. 5.7 cm |
|  | 60 sec. 5.9 cm |
| Bostwick Flow in cm's set | 15 sec. 3.1 cm |
|  | 30 sec. 3.4 cm |
| 5 minutes in machine | 45 sec. 3.4 cm |
|  | 60 sec. 3.4 cm |

The thixotropic gel could not be destroyed even after repeated stirring of product Example VII.

EXAMPLE VIII

This example demonstrates a physical blend of a starch which possesses a thixotropic gel and one which does not. A blend of 50% of Example VII and 50% of Control II were mixed together for 20 minutes in a twin shell blender and the thixotropic gel properties were evaluated on an acid pie cook. The results were as follows:

|  | Control II | Example VII | Blend |
|---|---|---|---|
| Brookfield 80°F. as made, stirred | 14,000 cps | 21,500 cps | 17,000 cps |
| After 5 minute rest | 14,000 cps | 30,500 cps | 26,000 cps |
| After 16 hours | 15,000 cps | 31,500 cps | 26,500 cps |
| After 16 hours, stirred | 14,000 cps | 21,500 cps | 17,500 cps |
| After 16 hours stirred, 5 minute rest | 14,000 cps | 30,500 cps | 26,000 cps |
| GSP | 16.0 | 15.0 | 15.5 |
| pH | 3.2 | 3.2 | 3.2 |
| Bostwick Flow in cm's stirred | 15 sec. 6.2 cm | 4.7 cm | 5.1 cm |
|  | 30 sec. 7.2 cm | 5.5 cm | 5.6 cm |
|  | 45 sec. 7.6 cm | 5.7 cm | 5.9 cm |
|  | 60 sec. 8.0 cm | 5.9 cm | 6.1 cm |
| Set 5 minutes in machine | 15 sec. 6.2 cm | 3.1 cm | 3.6 cm |
|  | 30 sec. 7.2 cm | 3.4 cm | 4.2 cm |
|  | 45 sec. 7.6 cm | 3.4 cm | 4.6 cm |
|  | 60 sec. 8.0 cm | 3.4 cm | 4.9 cm |

While the physical blend of Control II and Example VII did not show as great a thixotropic gel as did Example VII alone, it drastically changed Control II to a much improved product; viscosity, texture, clarity, flow characteristics and thixotropic gel.

EXAMPLE IX

In many reactions such as acid thin-boiled, bleached, esterified, etherified, esterified and etherified, and others, it is advantageous to carry out polyfunctional reaction to produce a starch product which has a thixotropic gel as well as an additional modification. This example demonstrates the use of the invention in producing an esterification reaction, changing the Granular Swelling Power and producing a thixotropic gel simultaneously. It is common knowledge that aliphatic acid anhydrides and substituted cyclic dicarboxylic acid anhydrides react with starches when the conditions are proper. One method as described in U.S. Pat. Nos. 2,461,139 and 2,613,206 describes the use of aliphatic acid anhydrides. Acetic anhydride will be used in this example and is mixed with an aldehyde (acrolein) to illustrate a simultaneous or polyfunctional reaction.

A slurry of dent corn starch in water containing 6,000 grams dry substance at a 23.5 Be°. was cooled to 80°F. A mixture of anhydride and aldehyde (acetic anhydride and acrolein) was used in the following proportions. Based on dry substance starch 12% acetic anhydride (720 grams) and 0.6% acrolein (32 grams) were allowed to equalize for at least 1 hour.

The mixture was then added to the starch slurry while maintaining the pH between 7.0 and 9.9 at all times with a 1:10 ratio of sodium hydroxide. The pH was adjusted to 5.5 with hydrochloric acid as soon as all of the acetic anhydride and aldehyde mixture had been added. The reaction product was then washed twice through a washing merco and filtered and dried to 10.0% moisture and labeled Example IX.

Product Example IX was checked in lemon pie filling mix at a 2.7 pH and exhibited properties which were desirable but unobtainable in conventional starches. Lemon pies made with this product were excellent, had good freeze-thaw properties, no pan flow, not pasty, not hard, but a nice mouth feel with a good thixotropic gel.

| Brookfield 80°F. stirred | 21,500 cps |
|---|---|
| After 5 minute rest | 35,000 cps |
| Stirred | 21,000 cps |
| After 5 minute rest | 35,000 cps |

The thixothropic gel could not be destroyed either by repeated stirring, heating, freezing, or cooling, and the Granular Swelling Power obtained was 17.5.

212°F. to about 300°F. are encountered. Due to the thixotropic gel of Example XIII the product stays thin through most of the heating process giving better heat transfer, less back pressure, and after cooling and setting has the desired viscosity when the thixotropic gel develops.

EXAMPLE XIV

Example X was repeated using 3% sodium bicarbonate instead of 2% disodium phosphate. The GSP after 1 hour was 48 and after 1½ hours was 44. The reaction was stopped after 2 hours when the desired GSP of 38 had been reached. The product when cooked up contained the desired thixotropic gel.

EXAMPLE XV

Example XV demonstrates the use of increments of the aldehyde to impart the desired amount of thixotropicity in the starch product. It has been found that some products are improved by having a large degree of thixotropic gel while others require a lesser degree of thixotropic gel.

Example I was repeated starting with 0.2% aldehyde (acrolein) and after neutralizing to pH 5.0 a sample was taken from the slurry and washed twice, filtered and dried to 10.0% moisture, and labeled Example XV, 0.2. The acid pie cook was run and the Brookfield viscosity checked after stirring and after a 5 minute rest. The stirred viscosity was 14,200 cps and the 5 minute rest viscosity was 18,200 cps. The balance of the slurry was again returned to pH 8.4 with dilute sodium hydroxide and an additional 0.2% acrolein was added and reacted 20 minutes after which the pH was again returned to 5.0 with hydrochloric acid and another sample taken, washed, filtered and dried to 10.0% moisture and checked as above. The sample was labeled Example XV, 0.4 and the acid pie cook was run. The stirred viscosity was 14,400 cps and the 5 minute rest viscosity was 19,800 cps.

The balance of the slurry was taken to 8.4 pH for the third time and another 0.2% acrolein added (making a total of 0.6% acrolein) reacted an additional 20 minutes and again neutralized to 5.0 pH with hydrochloric acid, washed twice through a washing centrifuge, filtered, washed and dried to 10.0% moisture and labeled Example XV, 0.6 and checked for its thixotropic gel. The results were as follows: Brookfield viscosity 80°F. stirred.

| Control XV | Example XV 0.2 | Example XV 0.4 | Example XV 0.6 |
|---|---|---|---|
| 14,000 cps | 14,200 cps | 14,400 cps | 15,200 cps |
| After 4 minute rest | | | |
| 14,000 cps | 18,200 cps | 19,800 cps | 21,000 cps |

All samples with the exception of the Control XV had the thixotropic gel with the amount of the thixotropic gel being increased as the increments of aldehyde were increased.

EXAMPLE XVI

Example XVI demonstrates the use of an aldehyde to impart the thixotropic gel to a tapioca starch.

1,000 grams dry substance tapioca starch at a 21.5 Be°. with a temperature of 120°F. was used. The pH was adjusted to 0.8 with dilute muriatic acid and 0.6% of acrolein was added. The reaction was checked each hour until the desired GSP was reached.

1 hour GSP — 48
2 hour GSP — 40
3 hour GSP — 33
4 hour GSP — 29

After 4 hours and with a GSP of 29 the product was neutralized to pH 5.0 with soda ash and washed through a washing centrifuge twice, readjusted to pH 5.0 and filtered and dried to 10.0% moisture.

Product Example XVI when cooked had very excellent thioxtropic gel properties.

EXAMPLE XVII

Example XVI was repeated but potato starch was substituted for tapioca starch and the reaction was carried out until a GSP of 19 was reached after 6 hours.

Product Example XVII when cooked had very excellent thixotropic gel properties.

EXAMPLE XVIII

Example XVI was repeated but a commercially available wheat starch was substituted for tapioca starch and the reaction was carried out until a GSP of 21 was reached after 5 hours.

Product Example XVIII when cooked had very excellent thixotropic gel properties.

EXAMPLE XIX

This example demonstrates the stability of the thixotropic gel when the starch is subjected to high temperature. Example I was repeated up to the point where the product was neutralized to pH 5.0 and the product was washed twice through a washing centrifuge. The Be°. at this point was 21.5 at 125°F. and the slurry was put through a votator at 300°F. and cooked, applied to hot rolls and dried to 8.0% moisture, ground through .008 screen to give a precooked starch. Control I also was precooked in the same manner and the results were as follows:

Control I precooked and Example I precooked were tested using the following method:

| Part I | 22.5 grams dry basis starch<br>100.0 grams sugar |
|---|---|
| Part II | 120 cc's cranberry juice cocktail<br>250 cc's water<br>60 grams Hi Sweet 71 Corn syrup |

Blend Part I thoroughly and add to Part II which has been placed in a mixer with medium agitation, mix 5 minutes and allow to hydrate 1 hour. Heat to 95°C. and hold 20 minutes, cool to 80°F. and check Brookfield viscosity.

| | Control I Precooked | Example I Precooked |
|---|---|---|
| Brookfield 80°F, as made, stirred | 8,000 cps | 8,000 cps |
| After 5 minute rest | 8,000 cps | 12,300 cps |

Example I precooked showed the thixotropic gel properties and returned with repeated stirring and set-

EXAMPLE X

This example demonstrates a polyfunctional reaction using vinyl acetate and acrolein (others could be used) to impart freeze-thaw, desired GSP, (22-24) and a thixotropic gel simultaneously, and to give a much improved starch product to be used in neutral systems of pH 8.5 to 5.0.

To a slurry of regular corn starch in water (6,000 grams dry substance). of 21.5 Be°. gravity and 90°F. temperature was added a mixture of 10% vinyl acetate (600 grams) and 0.6% acrolein (36 grams) which had been allowed to equalize for at least 1 hour. Previous to adding the mixture of vinyl acetate-acrolein 2% of disodium phosphate (120 grams) was added which gave a pH of 8.4. The slurry was allowed to react for 1 hour, after which the pH was lowered to 6.0 with dilute hydrochloric acid. The slurry was then washed twice in a washing centrifuge filtered and dried to 10% moisture. To demonstrate the thixotropic gel on Example X an acid pie cook and a neutral type cook were made and the results were as follows:

|  | Example X Cranberry Cook | Example X Neutral Cook 5%D.B. pH 6.5-7.0 |
|---|---|---|
| Brookfield 80°F stirred | 19,000 cps | 14,000 cps |
| After 5 minute rest | 27,000 cps | 20,000 cps |
| After 16 hours | 41,500 cps | 30,000 cps |
| After 16 hours stirred | 21,500 cps | 16,000 cps |
| After 16 hours stirred, 5 minute rest | 30,500 cps | 21,500 cps |
| Bostwick Flow in cm's stirred | 15 sec. 5.3 cm | 15 sec. 5.0 cm |
|  | 30 sec. 5.6 cm | 15 sec. 5.2 cm |
|  | 45 sec. 5.8 cm | 45 sec. 5.3 cm |
|  | 60 sec. 5.9 cm | 60 sec. 5.3 cm |
| Bostwick Flow in cm's | 15 sec. 3.7 cm | 15 sec. 2.5 cm |
|  | 30 sec. 4.0 cm | 30 sec. 2.8 cm |
| set 5 minutes in machine | 45 sec. 4.2 cm | 45 sec. 3.0 cm |
|  | 60 sec. 4.3 cm | 60 sec. 3.0 cm |
| GSP | 23.0 | 23.0 |
| pH | 3.4 | 6.7 |

Pudding made with Example X had improved characteristics over conventional pudding starches and could be used at a reduced level. Example X also gave an acceptable fruit type filling when used in pies even though the Granular Swelling Power was higher (23) than the normal range of 14-18. Due to the thixotropic gel the pies had no pan flow but rather stood up nicely in the shells when cut and observed.

EXAMPLE XI

Example III was repeated substituting a different aldehyde to impart the thixotropic gel. In this example the pH was adjusted to 9.9 with magnesium hydroxide and 0.1% of crotonaldehyde was added and the reaction was carried out for 2 hours. It has been found that when using various aldehydes it is necessary at times to change either the pH, temperature, or time to impart the desired amount of thixotropicity in the starch gel and it is believed that the reactivity of aldehydes varies. A standard acid type cook was made on Example XI against Control III and the results were as follows:

|  | Control III cps | Example III cps | Example XI cps |
|---|---|---|---|
| Brookfield 80°F. as made, stirred | 13,500 | 13,600 | 15,000 |
| After 5 minute rest | 13,500 | 22,300 | 19,250 |
| After 16 hours, stirred | 13,500 | 14,000 | 15,000 |
| After 16 hours stirred, rest 5 minutes | 13,500 | 23,000 | 19,000 |
| GSP | 15.0 | 15.0 | 15.6 |
| pH | 3.2 | 3.2 | 3.2 |
| Bostwick Flow in cm's stirred | 15 sec. 6.5 cm | 15 sec.4.1 cm | 15 sec.6.9 cm |
|  | 30 sec. 7.3 cm | 30 sec.4.6 cm | 15 sec.7.4 cm |
|  | 45 sec. 7.7 cm | 45 sec.5.5 cm | 45 sec.7.5 cm |
|  | 60 sec. 8.1 cm | 60 sec.5.7 cm | 60 sec.7.6 cm |
| Bostwick Flow in cm's set 5 minutes in machine | 15 sec. 6.5 cm | 15 sec.1.5 cm | 15 sec.4.9 cm |
|  | 30 sec. 7.3 cm | 30 sec.2.0 cm | 30 sec.5.6 cm |
|  | 45 sec. 7.7 cm | 45 sec.2.5 cm | 45 sec.5.9 cm |
|  | 60 sec. 8.1 cm | 60 sec.2.5 cm | 60 sec.6.0 cm |

As with Example III, Example XI had a much improved character over Control III, and the thixotropic gel could be easily observed.

EXAMPLE XII

Example X was repeated using soda ash with a slurry pH of 9.9 to give a lower GSP (14) with a polyfunctional reaction produced in 1 hour and a GSP which is acceptable for acid type cooks in pie fillings. Example XII gave desired freeze-thaw, Granular Swelling Power, thixotropic gel and was as acceptable as a starch produced using separate reactions. The Brookfield viscosity was increased 4,500 cps after a 5 minute rest and returned after repeated stirring and setting.

EXAMPLE XIII

This example demonstrates a polyfunctional reaction also and is a repeat of Example X with the time being increased to 1½ hours and the pH adjusted to 9.4 with a blend of 50% disodium phosphate and 50% trisodium phosphate to buffer the slurry reaction so as to give the desired GSP of 10-11. It is common knowledge that when cooking starches through jet cookers, plate heaters and coolers, auto-claves, etc., temperatures of ting. Bakers' jellies made with both products and subjected to the oven for 10 minutes at 350°F. showed Example I precooked to be much superior to the Control I precooked due to lack of flow in Example I precooked.

EXAMPLE XX

This example demonstrates the use of mixed aldehydes to impart the thixotropic gel. Example VI was repeated with the exception of the aldehyde. Example VI shows the use of 0.6% acrolein while in this example 0.3% acrolein and 0.3% acetaldehyde were mixed together, allowed to equalize for at least 1 hour and then added to the slurry. The aldehydes can also be added to the slurry individually if desired. The reaction was followed with the GSP and after 5½ hours the desired GSP of 22 was reached and the produced neutralized to pH 5.0 with soda ash, washed twice through a washing centrifuge, filtered and dried to 10.0 moisture and labeled Example XX. The thixotropic gel was checked using the normal non-acid type cook and a comparison was made as follows:

|  | Example VI | Example XX |
| --- | --- | --- |
| Brookfield 80°F. as made, stirred | 18,000 cps | 18,200 cps |
| After 5 minute rest | 26,500 cps | 26,300 cps |
| After 1 hour | 30,000 cps | 29,800 cps |
| Restirred | 18,000 cps | 18,200 cps |
| After 5 minute rest | 26,500 cps | 26,300 cps |
| Bostwick Flow in cm stirred | 15 sec. 3.1 cm | 15 sec. 3.2 cm |
|  | 30 sec, 3.2 cm | 30 sec. 3.3 cm |
|  | 45 sec. 3.3 cm | 45 sec. 3.4 cm |
|  | 60 sec. 3.3 cm | 60 sec. 3.4 cm |
| Bostwick Flow in cm set | 15 sec. 1.6 cm | 15 sec. 1.7 cm |
|  | 30 sec. 2.2 cm | 30 sec. 2.3 cm |
| 5 minutes in machine | 45 sec. 2.2 cm | 45 sec. 2.3 cm |
|  | 60 sec. 2.2 cm | 60 sec. 2.3 cm |
| GSP | 21.3 | 21.1 |
| pH | 6.0 | 6.0 |

Both Example VI and Example XX when checked in cream pie fillings and puddings gave many improved properties and the thixotropic gel were evident in both to about the same degree.

EXAMPLE XXI

This example demonstrates a starch product with a thixotropic gel produced in the dry state.

To 5,000 grams of powdered waxy starch which has a moisture of 10.0% was added 0.6% of an aldehyde (acrolein) based on dry substance starch, (27 grams) and the temperature was increased to 220°F. and held for 16 hours. The pH of the dried starch was 5.0. After the acrolein had been allowed to react for the 16 hour period the temperature was allowed to drop to ambient. At this point Granular Swelling Power was checked and the GSP obtained was 9.0.

To check and demonstrate the thixotropic gel, a standard salad dressing starch paste was cooked using Example XXI at 7.5% level which was allowed to cool to 80°F., and the following results were obtained using the Brookfield viscometer.

|  | Example XXI |
| --- | --- |
| Brookfield 80°F. as made | 9,300 cps |
| After 5 minute rest | 15,400 cps |
| Restirred | 9,300 cps |
| After 5 minute rest | 15,400 cps |

Example XXI had excellent thixotropic gel properties and could not be destroyed even after repeated stirring. As can be seen the advantage of a much lower viscosity when hot with lower usages is apparent when the product was used through plate heat exchangers and coolers as well as jet cookers. The finished salad dressing had a defininte advantage over conventional salad dressings due to the fact that, upon shaking or otherwise disturbing, the thixotropic gel of the starch used returned the salad dressing back to its original viscosity.

EXAMPLE XXII

Example XXII demonstrates the use of an aldehyde to impart a thixotropic gel in regular corn starch without any other type of modification whatsoever.

The pH of 6,000 grams of regular corn merco slurry at a 23.5 Be.° and a temperature of 125°F. was adjusted to 8.4 with a solution of soda ash, 0.6% of acrolein was added and the reaction allowed to go 20 minutes.

After 20 minutes the pH was adjusted to 5.0 with diluted hydrochloric acid. Based on the 6,000 grams dry substance starch the amount of acrolein used was 36 grams. The product was washed twice through a washing centrifuge and filtered and dried to 10% moisture and labeled Example XXII. At the same time a control sample was taken and adjusted to pH 5.0 and dried to 10.0% moisture. To check the difference between Control XXII and Example XXII a 6% basis Brabender cook was done on both samples. Both samples were cooked with uncontrolled heating to 95°C. and held 20 minutes, taken from the Brabender pot and force cooled to 80°F. Further tests were made to show the thixotropic gel properties of the Example XXII sample. The Brabender units on the Control XXII sample were 200 BU's after the 20 minute hold at 95°C. as compared to Example XXII which was 400 BU's after the 20 minute hold at 95°C.

The Brookfield viscosity of the two samples are as follows:

|  | Control XXII | Example XXII |
| --- | --- | --- |
| Brookfield 80°F. stirred | 165,000 cps | 75,000 cps |
| After 5 minute rest | 165,000 cps | 112,000 cps |

It was apparent that thixotropic gel was present and that the amount of retrogradation in Example XXII was also decreased.

EXAMPLE XXIII

Example XXII was repeated this time using waxy maize starch to replace the regular corn starch and the results were as follows:

|  | Control XXIII | Example XXIII |
|---|---|---|
| Brookfield 80°F. stirred | 14,500 cps | 5,000 cps |
| After 5 minute rest | 16,500 cps | 5,000 cps |

EXAMPLE XXIV

This example demonstrates the use of a higher level of aldehyde to give a thixotropic gel.

6,000 grams dry substance waxy maize starch was slurried in water to a 21.5 Be.° gravity at a temperature of 125°F. The slurry was cooled to 80°F. and the pH was adjusted to 3.0, and 10.0% of acrolein (600 grams) was added over a 10 minute period and the reaction mixture was allowed to react for 1 hour. The pH of the slurry was then adjusted to 5.0 with a dilute solution of soda ash and the slurry was then washed twice through a washing centrifuge, filtered and dried to 10.0% moisture.

The sample was labeled Example XXIV and the thixotropic gel properties of the product was checked at a 6% dry basis Brabender with uncontrolled heating to 95°F. and held for 20 minutes. The cook was then cooled to 80°F. and the Brookfield viscosity was then taken and the results were as follows:

|  | Example XXIV |
|---|---|
| Brookfield viscosity stirred | 21,000 cps |
| After 5 minute rest | 26,000 cps |
| Restirred | 21,000 cps |
| After 5 minute rest | 26,000 cps |

The product Example XXIV when made into pudding formulae had a very nice thixotropic gel and was much improved over conventional type pudding starches.

EXAMPLE XXV

This example demonstrates the use of an aldehyde to impart a thixotropic gel in a starch which has previously been cooked or gelatinized.

To 250 grams dry substance hydroxypropylated starch with a Granular Swelling Power of 16 was added 4,725 grams of water to give a 5% dry basis starch paste. The temperature is taken to 95°C. and held for 20 minutes and the starch paste was then reduced to 25°C. and the pH was raised to 8.4 with soda ash. At this point a viscosity was taken and the thixotropic gel properties were checked. The Heliopath viscosity after stirring was 6,000 cps and after setting 5 minutes still remained at 6,000 cps and it was evident that there was no thixotropic gel present. There then was added 0.6% acrolein based on the starch present (1.50 grams) and the batch was split into two equal portions and labeled Example XXV 20 minutes and Example XXV 40 minutes. Example XXV 20 minutes was neutralized to pH of 5.0 after 20 minutes and Example XXV 40 minutes was neutralized to pH of 5.0 after 40 minutes and the compositions were checked for their thixotropic gel properties and the results were as follows:

|  | Control XXV | Example XXV 20 Min. | 40 Min. |
|---|---|---|---|
| Brookfield 80°F. stirred | 6,000 cps | 9,000 cps | 9,000 cps |
| After 5 minute rest | 6,000 cps | 12,400 cps | 14,200 " |
| Restirred | 6,000 cps | 9,000 cps | 9,000 " |
| After 5 minute rest | 6,000 cps | 12,400 cps | 14,200 " |

It will be recognized that the foregoing examples are primarily concerned with the preparation of trixotropic starches suitable for use in foods. Such products can also be used for other purposes, for example, in the sizing or coating of paper, textiles or the like, and where they are used for such other purposes, the desired thixotropic property may be imparted by employing as the aldehyde reactant formaldehyde, paraformaldehyde, benzaldehyde, or other aldehydes.

The invention is hereby claimed as follows:

1. A process of producing a thixotropic starch which comprises reacting a starch in the form of solid particles with 0.01 to 10.0% by weight of an aldehyde, carrying out said reaction at a predetermined pH within the range of 0.1 to 9.9 at a temperature within the range of 30°F. to 350°F. for 1 minute to 40 hours while maintaining an excess of said aldehyde, washing the resultant product with water sufficiently to remove the excess aldehyde, the temperature and time of heating being such that a thixotropic starch is obtained after removal of excess aldehyde by washing with water, and recovering the solid thixotropic starch.

2. A process as claimed in claim 1 in which the pH of the reaction product is adjusted to within the range of 5 to 7 in the washing and recovering of said product.

3. A process as claimed in claim 1 in which acrolein is used as the aldehyde and the amount employed is not more than 0.6% by weight.

4. A process as claimed in claim 1 in which the pH during the reaction is within the range of 7.0 to 9.9.

5. A process as claimed in claim 1 in which the pH during the reaction is within the range of 0.1 to 7.

6. A process as claimed in claim 1 in which the pH during the reaction is within the range of 1.8 to 3.

7. A process as claimed in claim 1 in which the thixotropic starch when cooked in proportions of 5.5% by weight starch in a standard acid pie cook without fruit and cooled has a Brookfield viscosity at 80°F. of approximately 14,000 to 35,000 centipoises when allowed to rest 5 minutes after being stirred.

8. A thixotropic starch resulting from the process as claimed in claim 1.

9. A thixotropic starch resulting from the process as claimed in claim 7.

* * * * *

UNITED STATES PATENT AND TRADEMARK OFFICE
CERTIFICATE OF CORRECTION

PATENT NO. : 3,878,196
DATED : April 15, 1975
INVENTOR(S) : GLEN C. GLASSCOCK and JOSEPH E. BOYLE It is certified that error appears in the above-identified patent and that said Letters Patent are hereby corrected as shown below:

Column 2, line 61, "benzaldehydes" should read --benzaldehyde--.

Column 4, line 61, "reaciton" should read --reaction--.

Column 5, line 60, "now" should read --not--.

Column 10, line 5, "hydrochloric" should read --(hydrochloric)--.

Column 10, under "Example VI" in the table, line 10, "16.cm" should read --1.6 cm--.

Column 14, under "Example XI cps", line 8, "15 sec." should read --30 sec.--.

Column 17, line 17, "produced" should read --product--.

Column 18, line 7, "defininte" should read --definite--.

Signed and Sealed this twenty-third Day of December 1975

[SEAL]

Attest:

RUTH C. MASON
Attesting Officer

C. MARSHALL DANN
Commissioner of Patents and Trademarks